United States Patent
Crumbach et al.

(10) Patent No.: US 8,036,962 B2
(45) Date of Patent: Oct. 11, 2011

(54) SYSTEMS AND METHODS FOR DETERMINING PAYERS IN A BILLING ENVIRONMENT

(75) Inventors: Manfred Crumbach, Wiesloch (DE); Martin von der Emde, Rauenberg (DE)

(73) Assignee: SAP AG, Walldorf (DE)

( * ) Notice: Subject to any disclaimer, the term of this patent is extended or adjusted under 35 U.S.C. 154(b) by 1674 days.

(21) Appl. No.: 10/460,295

(22) Filed: Jun. 13, 2003

(65) Prior Publication Data
US 2004/0254866 A1    Dec. 16, 2004

(51) Int. Cl.
G07F 19/00    (2006.01)
H04M 15/00   (2006.01)

(52) U.S. Cl. .................. 705/34; 705/40; 379/114.21
(58) Field of Classification Search .......... None
See application file for complete search history.

(56) References Cited

U.S. PATENT DOCUMENTS

| | | | |
|---|---|---|---|
| 5,704,044 A * | 12/1997 | Tarter et al. | 705/4 |
| 5,852,812 A * | 12/1998 | Reeder | 705/39 |
| 6,456,986 B1 * | 9/2002 | Boardman et al. | 705/400 |
| 6,539,082 B1 * | 3/2003 | Lowe et al. | 379/114.28 |
| 6,556,659 B1 * | 4/2003 | Bowman-Amuah | 379/9.04 |
| 6,915,266 B1 * | 7/2005 | Saeed et al. | 705/2 |
| 6,996,542 B1 * | 2/2006 | Landry | 705/40 |
| 2001/0056362 A1 * | 12/2001 | Hanagan et al. | 705/7 |
| 2002/0042715 A1 * | 4/2002 | Kelley | 705/1 |
| 2004/0022378 A1 * | 2/2004 | Kugell et al. | 379/144.01 |
| 2005/0055220 A1 * | 3/2005 | Lee et al. | 705/1 |

* cited by examiner

*Primary Examiner* — Luna Champagne
(74) *Attorney, Agent, or Firm* — Finnegan, Henderson, Farabow, Garrett & Dunner, LLP

(57) ABSTRACT

Methods, systems, and articles of manufacture are disclosed for determining payers of cost events in a billing environment. A biller may provide billable services or goods for its customers. At least one participant may be involved in rendering the services or goods, or a service or good related thereto. The payer for each invoice may be determined depending on one or more factors, such as the type of service or good provided and/or the relationships between the involved participant. Additional features may be provided, such as issuing an invoice to the identified payer to request payment.

35 Claims, 9 Drawing Sheets

| Type | Sub-Type | Participant A (Role) | ... | Participant B (Role) |
|---|---|---|---|---|
| 28-A | 28-B | 28-C1 | | 28-CN |

| Type | Sub-Type | Payer (Role) |
|---|---|---|
| ⋮ | ⋮ | ⋮ |
| 36-A | 36-B | 36-C |

SYSTEMS AND METHODS FOR DETERMINING PAYERS IN A BILLING ENVIRONMENT

BACKGROUND OF THE INVENTION

I. Field of the Invention

The present invention generally relates to billing methods and systems, including electronic billing methods and systems implemented through computer hardware and software. More particularly, the invention relates to systems, methods and articles of manufacture for determining payers of cost events and for presenting invoices to such payers by, for example, electronic presentment or other means.

II. Background and Material Information

In the marketplace, service providers, merchants and other entities supply services and goods to customers. Such services and goods are typically offered in exchange for a predetermined monetary value or payment amount. In exchange for delivering the services or goods to a customer, service providers and merchants (collectively "billers") will request payment by issuing an invoice to a customer. As used herein, the term "customer" broadly refers to any person, business, institution, agency or other entity that receives services or goods from a biller. Further, the term "biller" is not limited to service providers and merchants, but broadly refers to any person, business, vendor, institution, agency or other entity that is capable of providing services or goods, including for example, individuals, small and medium-size companies (SMEs), financial institutions including banks and credit agencies, universities, colleges, schools, government agencies, utilities, wholesalers, retailers, etc.

Invoices may be issued to customers using various techniques, such as mailing a printed invoice or statement to a customer based on, for example, the customer's mailing or billing address. In recent years, other methods have become widely available, such as electronic presentment. With electronic presentment, an invoice from a biller is electronically presented to the customer. This may be achieved by, for example, an e-mail communication, a remote dial-up connection, or a web site on the Internet. Also known are electronic bill presentment and payment (EBPP) systems, which electronically present invoices and permit customers to electronically pay such invoices through one or more payment processing services or features.

Various types of EBPP systems are known. In one type of EBPP, the biller directly generates electronic invoices and electronically presents the same to its customers. Direct EBPPs may be implemented through, for example, an Internet web site that is maintained by or for the biller. In such systems, customers of the biller may log onto the web site (e.g., by entering a username and password, etc.) to review and pay invoices on-line.

Another type of EBPP is a consolidated EBPP. Typically operated by a "biller consolidator," such as a bank or bill service agency, these systems permit customers to access and view electronic invoices from several billers. In a consolidated EBPP, a secure bill presentment site on the Internet, or other type of network, may be provided to allow each customer to review and pay invoices from a plurality of billers. Customers may be charged for services rendered by the biller consolidator. Further, the biller consolidator may charge each biller for the service, but such costs are usually less than a self-maintained site and thus beneficial to billers. Consolidated EBPPs are also attractive to customers, even if they involve service charges, because consolidated EBPPs provide a single site through which invoices from several different billers may be reviewed and paid by a customer.

Often, a number of participants may be involved in rendering services or goods to a customer. For example, a service provider or merchant may engage one or more partners to provide a particular service or good for a customer. In some cases, the customer may not be aware of all of the participants involved in providing the final services or goods, such as where the customer only has a direct contractual relationship with the main service provider or merchant. Further, it is possible that the main service provider or merchant is not totally aware of all participants, particularly where a business partner or other participant has engaged a third party to provide assistance in its operations or where the other participant has no direct contractual relationship with the main service provider or merchant. Moreover, even where some or all of the participants are known, the number of participants and/or the relationships between the participants can cause confusion and/or uncertainty as to which entities are responsible for costs incurred in rendering particular services or goods.

Such billing environments create challenges for most conventional billing methods and systems. For example, conventional methods and systems are not capable of flexibly determining payers for billable events, such as where the responsible payer is a participant other than the customer or where multiple participants are involved in rendering the services or goods and there is difficulty in identifying the responsible payer. Further, existing EBPPs are not capable of effectively processing billable events where the participant(s) may not have a direct contractual relationship with the customer or the main service provider or merchant.

In view of the foregoing, there is a need for improved systems, methods and articles of manufacture for determining payers in billing environments, including complex billing environments. There is also a need for improved billing methods and systems for flexibly determining payers for billable events based on one or more factors, such as the type of services or goods provided and/or the participants involved. Moreover, there is a need for improved billing methods and systems for determining payers in billing environments and presenting invoices to such payers by, for example, electronic presentment or other means.

SUMMARY OF THE INVENTION

Consistent with embodiments of the present invention, systems, methods and articles of manufacture are provided for determining payers in billing environments, including complex business environments. Embodiments of the invention include systems and methods that are adapted to flexibly determine the payers for cost events based on, for example, the type of services or goods provided and/or the participants involved. Embodiments of the invention also include systems and methods for determining payers in billing environments and presenting invoices to such payers by, for example, electronic presentment. Additional features may also be provided, including payment processing to enable payers to make payment on outstanding invoices.

In accordance with an embodiment of the invention, systems, methods and articles of manufacture are provided for distributing, presenting and accepting payment for invoices related to billable services or goods (generally referred to as "cost events"). A biller may provide a set of chargeable services or goods for its customers. At least one partner may be involved in rendering the services or goods, or any service or good related thereto. The payer for each cost event may be determined in accordance with one or more factors, such as the type of service or good provided and the relationships between the involved participants.

According to an embodiment of the present invention, a method is provided for determining payers of cost events in a billing environment. The method comprises: providing cost event data, the cost event data comprising data related to at least one cost event involving a plurality of participants, wherein each participant has a role related to the at least one cost event; providing payer definition data, the payer definition data defining payers of cost events according to the roles of participants; analyzing the cost event data and the payer definition data to identify the payer for the at least one cost event; and creating an invoice to request payment from the identified payer for the at least one cost event.

The method may further comprise analyzing additional data to determine the payer of the at least one cost event, wherein the additional data comprises at least one of geographical data, customer account data and contract relationship data. The geographical data may be analyzed to determine the payer of the at least one cost event based on the location of one of the participants or where a service or good related to the cost event is rendered. The customer account data may include data identifying a payer according to at least one of an award, credit and account status level. Further, the contract relationship data may comprise data indicating contractual relationships between the participants involved with the at least cost event. In one embodiment, the contract relationship data is analyzed to confirm that a contractual relationship exists between a biller of the at least one cost event and a participant identified as the payer.

In accordance with another embodiment of the invention, a method is provided for determining payers of cost events. The method comprises: providing cost event data, the cost event data comprising data related to at least one cost event involving a plurality of participants, wherein each participant has a role related to the at least one cost event; providing payer definition data, the payer definition data defining a payer for the at least one cost event according to the role of a participant; providing contract relationship data, the contract relationship data indicating contractual relationships between the participants related to the at least one cost event; and analyzing the cost event data, the payer definition data and the contract relationship data to identify the payer for the at least one cost event, wherein analyzing comprises analyzing the contract relationship data to identify a contractual relationship between a biller of the at least one cost event and a participant defined as a payer for the at least one cost event by the payer definition data.

Consistent with yet another embodiment of the invention, a system is provided for determining payers of cost events, wherein each cost event is related to a billable service or good and involves a plurality of participants. The system comprises: means for storing cost event data, the cost event data comprising data indicating the participants related to at least one cost event and a role performed by each participant; means for storing payer definition data, the payer definition data defining payers of cost events according to the roles of participants; means for analyzing the cost event data and the payer definition data to identify the payer for the at least one cost event; and means for issuing an invoice to request payment from the identified payer for the at least one cost event.

In accordance with another embodiment of the invention, a system is provided for determining payers of cost events. The system comprises: means for providing cost event data, the cost event data comprising data related to at least one cost event involving a plurality of participants, wherein each participant has a role related to the at least one cost event; means for providing payer definition data, the payer definition data defining a payer for the at least one cost event according to the role of a participant; means for providing contract relationship data, the contract relationship data indicating contractual relationships between the participants related to the at least one cost event; and means for analyzing the cost event data, the payer definition data and the contract relationship data to identify the payer for the at least one cost event, wherein the analyzing means comprises means for analyzing the contract relationship data to identify a contractual relationship between a biller of the at least one cost event and a participant defined as a payer for the at least one cost event by the payer definition data.

Embodiments of the invention also relate to computer-readable media, such as computer software products. For example, in one embodiment, a computer-readable medium is provided that stores program instructions that are executable by a computing-based environment to perform a method for determining payers of cost events. Each cost event may relate to a billable service or good and involve a plurality of participants. Further, the method performed by the computer-readable may comprise: providing cost event data, the cost event data indicating the type of billable service or good related to at least one cost event and the role of each participant involved in the at least one cost event; providing payer definition data, the payer definition data defining at least one payer for the at least one cost event according to the role of a participant; analyzing the cost event data and the payer definition data to identify the payer for the at least one cost event; and creating an invoice for the at least one cost event to request payment from the identified payer.

In another embodiment, a computer-readable medium is provided that stores program instructions that are executable by a computing-based environment to perform a method for determining payers of cost events. The method comprises: providing cost event data, the cost event data comprising data related to at least one cost event involving a plurality of participants, wherein each participant has a role related to the at least one cost event; providing payer definition data, the payer definition data defining a payer for the at least one cost event according to the role of a participant; providing contract relationship data, the contract relationship data indicating contractual relationships between the participants related to the at least one cost event; and analyzing the cost event data, the payer definition data and the contract relationship data to identify the payer for the at least one cost event, wherein analyzing comprises analyzing the contract relationship data to identify a contractual relationship between a biller of the at least one cost event and a participant defined as a payer for the at least one cost event by the payer definition data.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various embodiments and aspects of the present invention. In the drawings:

FIG. 5 is a block diagram of an exemplary file structure for storing cost event data, consistent with embodiments of the present invention;

FIG. 6 is a block diagram of an exemplary file structure for storing payer definition data, consistent with embodiments of the present invention;

DETAILED DESCRIPTION

Embodiments of the present invention are directed to systems, methods and articles of manufacture for determining payers of cost events in a billing environment. As used herein, the term "payer" broadly refers to any person, business, organization, agency or other entity that is responsible for making payment or otherwise settling an invoice or bill. Further, the term "cost event" generally refers to any billable or otherwise chargeable event in the billing environment. This includes, but is not limited to, billable services or goods requested by or provided to a customer or another participant. The determination of the payer for a cost event may depend on various factors, including the type of services or goods offered, the participants involved, and/or the relationship(s) between the participants. In one embodiment, the contractual relationship(s) between the participants is a factor for determining the payer of an invoice.

As further disclosed herein, embodiments of the invention may be utilized in billing environments, including complex billing environments, where one or more participants are involved. For instance, in a billing environment, a direct or indirect contractual relationship may exist between a customer and a biller, such as a service provider or merchant. In rendering services or goods to its customers, the biller may engage the services of one or more partners (i.e., other service providers or merchants). This engagement may be the result of direct or indirect contractual relationships with the biller's partners or other participants. In certain cases, multi-level indirect contractual relationships may exist. Moreover, other chargeable services or goods may arise which require payment by responsible payer(s).

Figure 1:
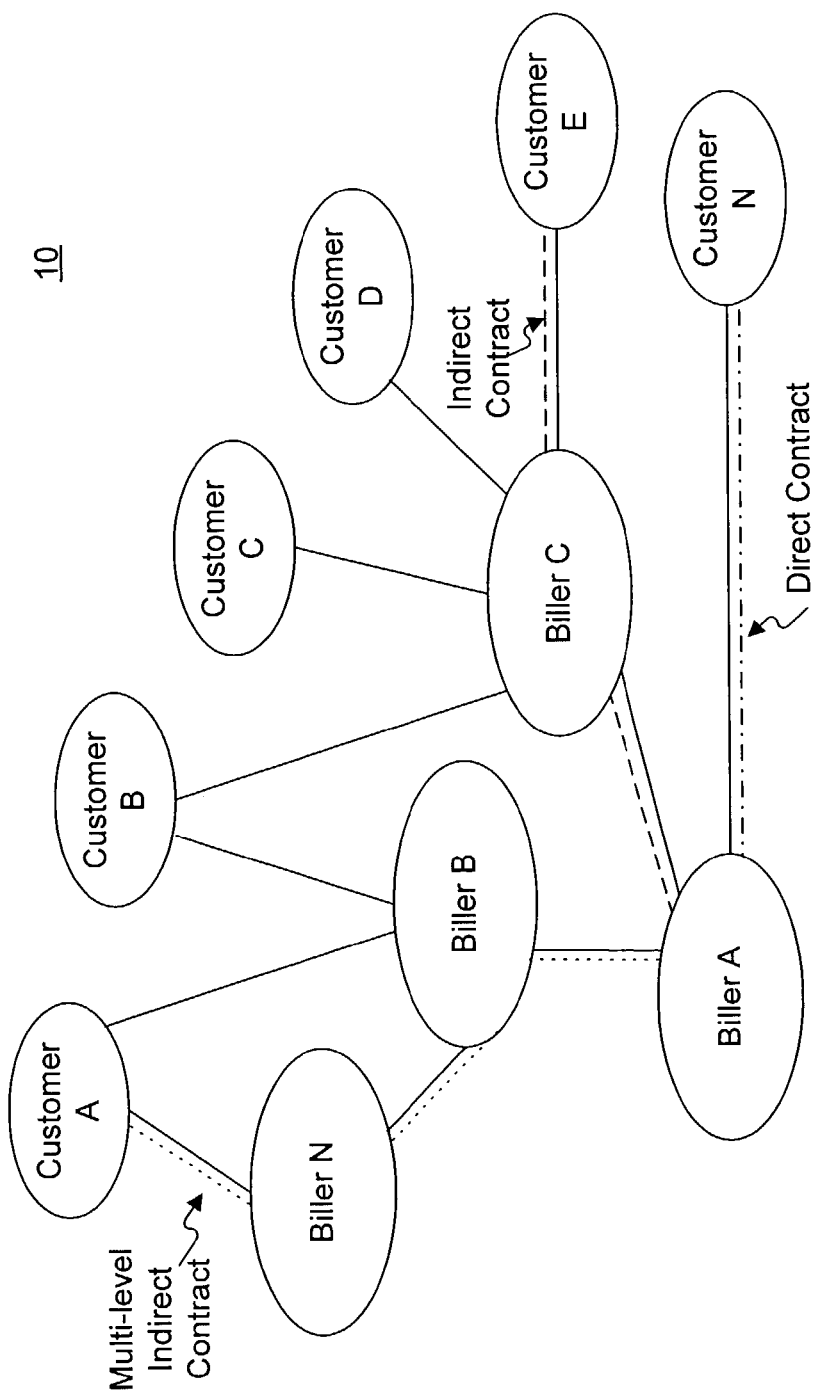
FIG. 1 is a diagram of an exemplary complex billing environment comprising a plurality billers and customers.

By way of illustration, FIG. 1 is a diagram of an exemplary billing environment 10. As shown in FIG. 1, billing environment 10 includes a plurality of billers (A-N) and a plurality of customers (A-N). Each "biller" may be any person, service provider, merchant, vendor, or other entity that is capable of providing goods or services. By way of example, billers may include individuals, small and medium-size companies (SMEs), financial institutions including banks and credit agencies, universities, colleges, schools, government agencies, utilities, wholesalers, retailers, etc. Further, each "customer" may be any person, business, institution, agency or other entity that receives services or goods. In certain cases, billers may also receive services or goods from other billers.

The relationships between the billers and customers in billing environment 10 can vary in numerous ways. For example, as illustrated in FIG. 1, a direct contractual relationship exists between biller A and customer N. In contrast, biller A has an indirect contractual relationship with customer E. This indirect relationship may exist as a result of numerous factors, including the existence of direct contractual relationships between biller A and biller C and between biller C and customer E. Moreover, in certain cases, multi-level indirect contractual relationships may exist between certain entities or participants. For instance, as shown in FIG. 1, a multi-level indirect relationship exists between biller A and customer A. This relationship may arise due to direct contractual relationships or arrangements between billers A and B, billers B and N, and biller N and customer A.

Consistent with embodiments of the invention, direct and indirect contractual relationships may be related to the rendering of services and/or goods. These contractual relationships may exist due to written, oral or implied contracts, agreements or other arrangements that require the payment of a monetary amount or other consideration in exchange for the delivery or performance of specified services and/or goods. The invoices for such services or goods may be issued before or after providing the requested services or goods. Embodiments of the invention, however, are not limited to relationships based on contracts for services or goods, and may be applied to other types of relationships such as partnerships, affiliations, joint ventures and/or other types of relationships.

In the exemplary environment of FIG. 1, the exchange and distribution of invoices may be complicated due to various factors, including the number of participants, the relationships between the participants, the number or volume of invoices, special processing required for certain invoices, updates to invoice processing or handling, etc. Errors or delays can also arise due to, for example, the lack of an integrated or uniform billing system. Moreover, flexibility is required in order to handle different billing scenarios where, for example, the identity of the responsible payer may vary depending on the services or goods rendered, the participants involved, the contractual relationships and/or other factors such as the location of the participants.

Consistent with embodiments of the invention, systems, methods and articles of manufacture are provided for determining the payers of cost events. Such embodiments may be adapted and used for billing environments, such as the billing environment of FIG. 1. As will be appreciated by those skilled in the art, computer hardware and/or software may be utilized to implement the systems and methods of the invention. Further, embodiments of the invention may be embodied as an article of manufacture, such as a computer-software product. In such embodiments, programming instructions may be provided on a computer readable medium or carrier signal and be adapted to perform methods of the invention when executed with a computer-based platform.

Figure 2:
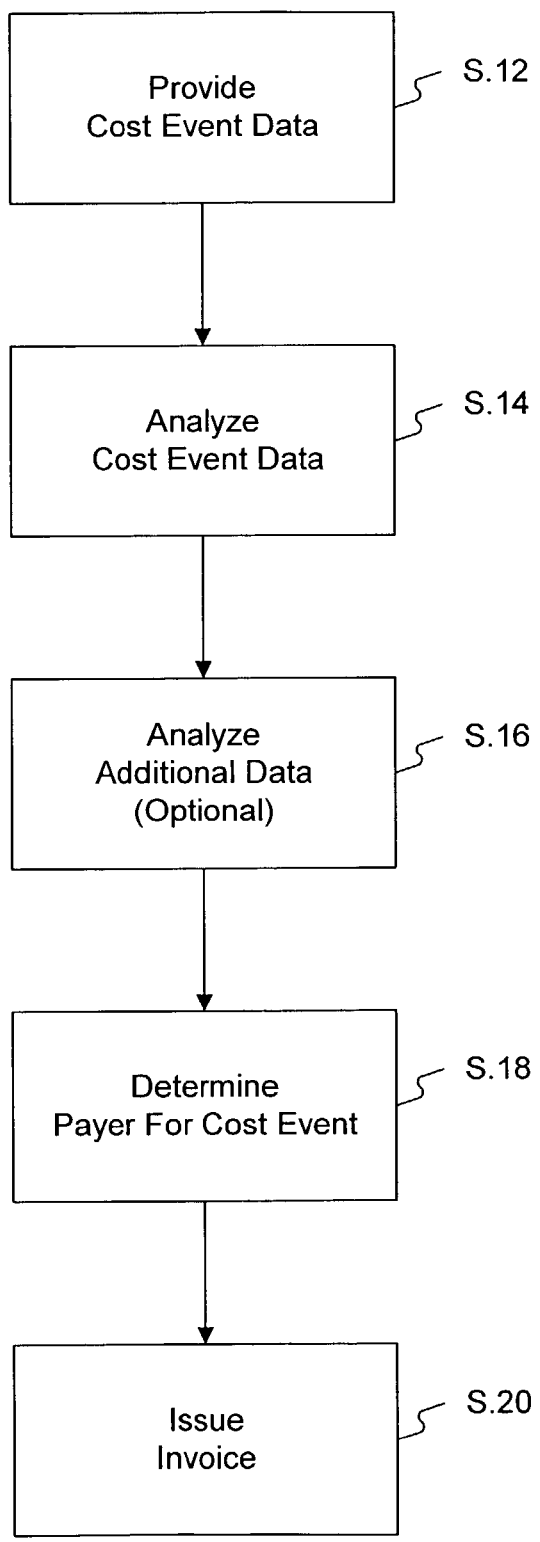
FIG. 2 is a flow chart of an exemplary method for determining payers in a billing environment, consistent with embodiments of the present invention.

FIG. 2 is a flowchart of an exemplary method for determining payers in a billing environment, consistent with embodiments of the invention. The exemplary method of FIG. 2 may be embodied in hardware and/or software, and/or provided as part of the functionality of an electronic billing system. Alternatively, where feasible, the exemplary method of FIG. 2 may be performed manually by one or more individuals. Further, although not specifically illustrated, the process flow of FIG. 2 may be performed with respect to each invoice to be processed and/or distributed. Such processing of invoices may be carried out individually in succession or may be performed substantially simultaneously or in parallel, consistent with the needs of the billing environment.

Initially, data related to a cost event is provided (S.12). The cost event data may be recorded electronically or manually (e.g., by a handwritten or printed receipt) and retrieved from a storage medium or received from a biller. Preferably, the cost event data provides information related to, for example, the billable or otherwise chargeable set of services or goods. This information may include the name, type and/or quantity of the services or goods that were provided. In addition, the cost event data may indicate the date on which the services or goods were rendered, as well as identify the various participants, such as the name of the biller or provider of the services or goods, the customer, the provider's bank, the customer's bank, etc.

As further illustrated in FIG. 2, the cost event data is analyzed (S.14). Consistent with embodiments of the invention, the cost event data may be analyzed individually or, optionally, with the additional data (S.16). The analysis of the cost event data and/or additional data is performed in order to determine the identity of the payer for a cost event (S.18). Once the appropriate payer is identified, an invoice is issued to the payer in order to request payment for the cost event (S.20). In accordance with embodiments of the invention, the invoice may be issued using various means, such as e-mail, a web site on the Internet, a printed invoice or bill mailed to the payer, etc. Conventional payment processing may also be provided as part of the exemplary method of FIG. 2 in order to accept and process payment from the payer.

Various approaches may be implemented to identify the payer in the embodiment of FIG. 2 based on the cost event data and/or additional data. In one embodiment, the cost event data includes specific information indicating the payer for a cost event. Such payer information may be defined by the biller. This arrangement may be useful where the biller is aware of the participants and/or contractual relationships involved in rendering the services or goods to a customer. In such cases, the biller can define the responsible payer as part of the cost event data. For purposes of illustration, in the exemplary environment of FIG. 1, the cost event data may include data indicating that customer N is responsible for payment of services or goods directly rendered by biller A. In contrast, biller C may indicate in the cost event data that biller A is the responsible payer for payment to biller C for the goods or services provided to customer E. In turn, biller A may factor in this cost from its partnership with biller C when issuing to customer E an invoice for payment. Similar data may be included in the cost event data related to other indirect or multi-level indirect contractual relationships, such as those illustrated in FIG. 1.

In another embodiment of the invention, additional data may be stored and analyzed (S.16) with the cost event data to determine the payer of an invoice. For example, business or payer model definitions may be provided. The business model definitions may identify the payer dependent on the type of services or goods rendered and/or the participants involved. The model definitions may apply to a specific cost event or a plurality of cost events. Thus, referring again to the exemplary environment of FIG. 1, business or payer model data may define that certain invoices from biller C should be paid by biller A. Similarly, for the illustrated multi-level indirect relationship, business model data may specify that certain invoices from biller N are to be paid by biller A or biller B. Where more than one possible biller is defined by the business model data (such as biller A or biller B), the appropriate payer may be determined based on the type of services or goods rendered. Additionally or alternatively, the contractual relationships between the participants and/or types of services or goods may be defined in the business model data and used to determine the payers of invoices.

Other additional data may be considered with the cost event data. For example, in yet another embodiment of the invention, geographical data is analyzed. The geographical data may be used to determine the appropriate payer based on the location of the customer or other participant(s), the location or region where the services or goods are rendered, etc. For example, assume biller A in FIG. 1 is a merchant of goods and customer E has agreed to purchase goods from biller A. Further, assume that biller C is a shipper or courier for biller A and is responsible for delivering the requested goods to customer E. In cases where customer E is a domestic resident, delivery that is performed domestically by biller C may be paid by biller A (i.e., shipping costs are included in the price of the goods). However, if customer E is a foreign resident requiring international shipping, delivery charges may be extra and customer E may be designated as the payer for those charges.

The embodiment of FIG. 2 may also be implemented to take into consideration specific customer data. For instance, in addition to the cost event data, a customer's account data may be analyzed to determine the appropriate payer as part of steps S.14-S.18. Customer account data such as credits, awards or account status may be used to determine the payer. In one embodiment, customer account data may result in mandatory or special processing of cost events, in which case a reassignment of the responsible payer for an invoice may be required. By way of example, credits, awards or the status of a customer's account (such as the account of customer E) may require that a biller (such as biller A or biller C) or even another customer (such as customer D) be designated as the responsible payer for a cost event.

In accordance with additional embodiments of the invention, the cost event data and additional data may be considered individually or together to determine the payer of an invoice. Additionally or alternatively, particular data may be given priority over other data. Thus, for example, payer information provided in the cost event data may be given a lower priority to business model data or customer account data, or vice versa. In this way, the payer for a cost event can be designated, modified and/or changed according to the needs of the billing environment. Therefore, if special credits, awards or account status levels need to be applied, the customer account data may be analyzed to identify the appropriate payer. In certain cases, the payer may be an entity other than that designated by the payer information in the cost event data or by other additional data (such as business model definitions). Conversely, if a biller needs to override the definition provided by a predetermined business model, the biller can do so by providing specific payer information in, for example, the cost event data. Such features permit the payer to be defined and identified more flexibly in billing environments, such as the exemplary billing environment of FIG. 1.

As stated above, the exemplary method of FIG. 2 may be implemented in a billing system, such as an electronic billing system. The billing system may be adapted to provide numerous functions, including electronic bill presentment and payment. Accordingly, direct or consolidated EBPPs may be adapted to perform the exemplary method of FIG. 2. As will be appreciated by those skilled in the art, other electronic or manual systems may also be employed.

Figure 3:
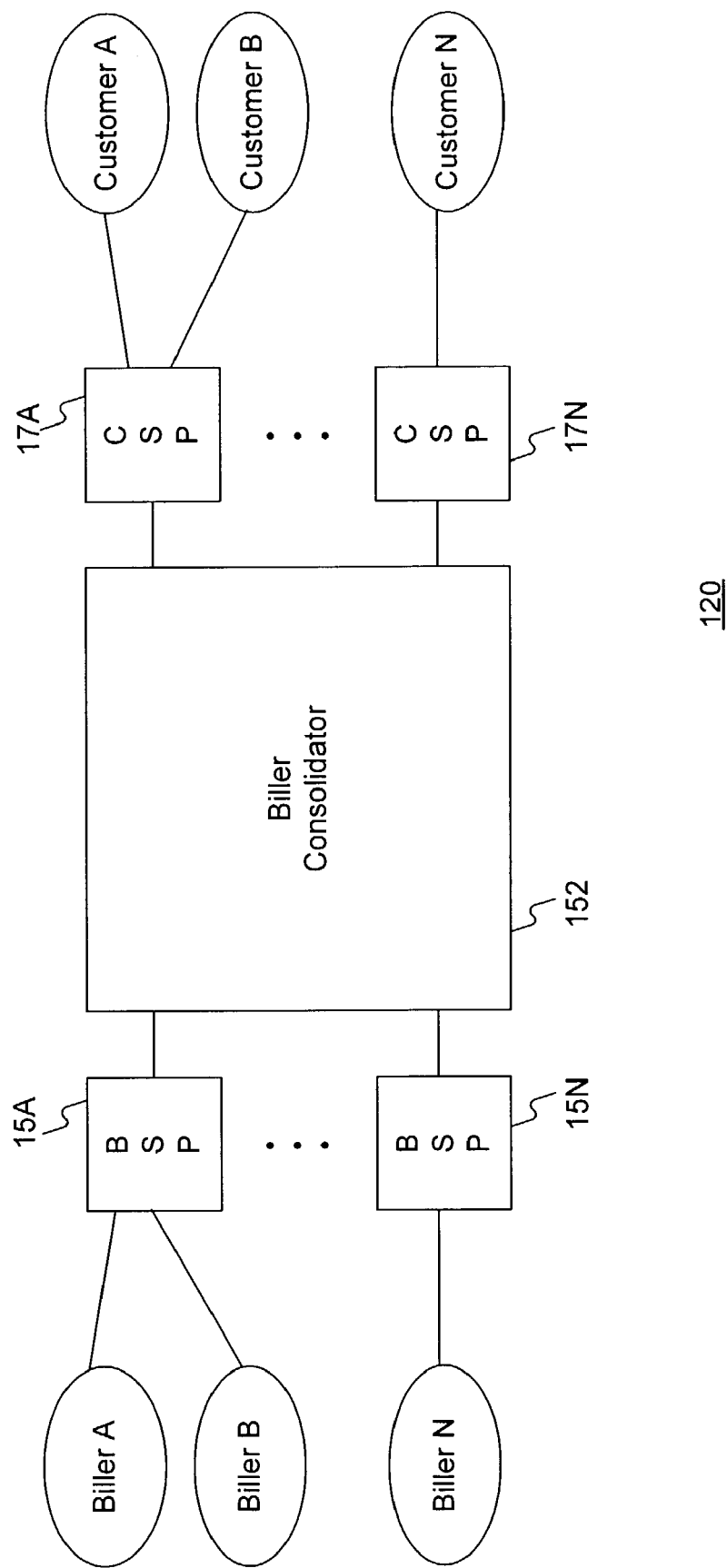
FIG. 3 is a block diagram of an exemplary bill presentment and payment system, consistent with embodiments of the present invention.

By way of example, FIG. 3 illustrates an exemplary billing system 120 for implementing embodiments of the invention, including the exemplary method of FIG. 2. As shown in FIG. 3, billing system 120 is configured as a consolidated billing system and includes a billing consolidator 152. Billing consolidator 152 may comprise a computer-based platform configured with appropriate software, such as the SAP Biller Consolidator developed by SAP Aktiengeselllschaft, Walldorf, Germany. Biller consolidator 152 may be operated by a financial institution or other entity and provide services to a plurality of billers A-N and customers A-N. Optionally, biller consolidator 152 may include or communicate with one or more biller service providers (BSPs) and customer service providers (CSPs). For purposes of illustration, a plurality of BSPs 15A-15N and CSPs 17A-17N are shown in FIG. 3. However, billing system 120 may be implemented without any BSPs or CSPs, in which case billers A-N and customers A-N may directly communicate with biller consolidator 152.

Each of the BSPs 15A-15N may provide services to one or more billers A-N. Among other services, BSPs 15A-15N may prepare and/or deliver invoices to biller consolidator 152 on behalf of one or more the billers A-N. Therefore, relative to BSPs 15A-15N, billers A-N may be viewed as "customers" of the BSPs. Similarly, each of the CSPs 17A-17N may provide services to one or more customers A-N. CSPs 15A-15N may provide various services, including the delivering invoices from biller consolidator 152 to its respective customers. CSPs may also provide payment settlement processes that permit customers to pay outstanding invoices. Thus, relative to CSPs 17A-17N, customers A-N may be viewed as "customers" of the CSPs, while also being a "customer" of one or more of the billers A-N.

As will be appreciated by those skilled in the art, BSPs 15A-15N and CSPs 17A-17N may be implemented with computer hardware and/or software, and may be operated by the same entity that provides biller consolidator 152 or may be operated by separate entities or third parties (such as banks or other financial institutions). Moreover, as stated above, the embodiment of FIG. 3 may be implemented without BSPs or CSPs, in which case biller consolidator 52 communicates directly with billers A-N and customers A-N.

Consistent with embodiments of the invention, cost event data may be recorded to keep track of chargeable services or goods. As disclosed herein, a "cost event" may relate to any service or good provided to a customer, including services or goods provided by biller consolidator 152, BSPs 15A-15N and/or CSPs 17A-17N. The cost event data may comprise data for generating an invoice and may be recorded electronically or manually (e.g., by a handwritten or printed receipt). Thus, when required for processing, the cost event data may be retrieved from a storage medium or received from a biller.

Figure 4:
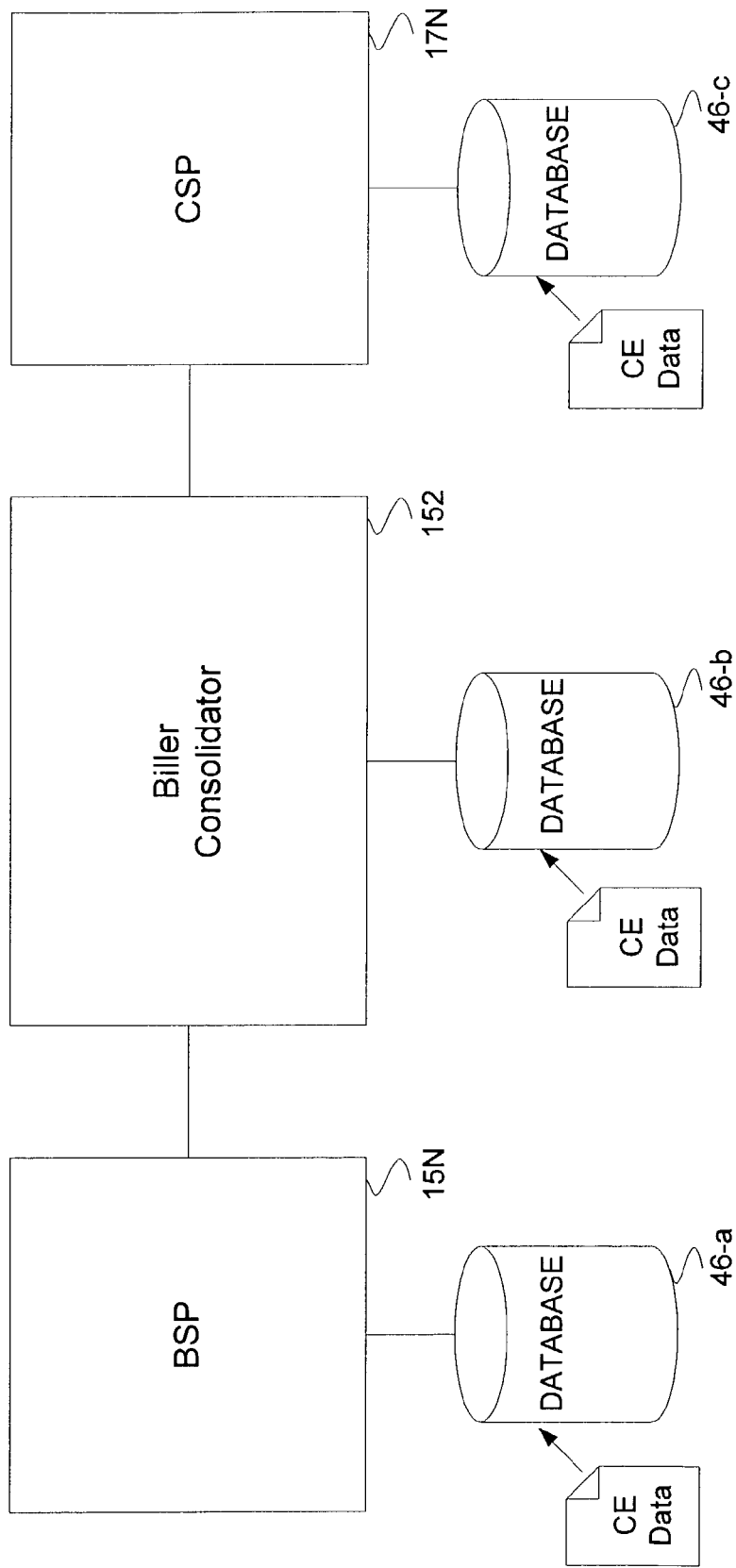
FIG. 4 is an exemplary representation of one or more sources for providing cost event data, consistent with embodiments of the present invention.

For purposes of illustration, FIG. 4 is an exemplary representation of one or more sources for providing cost event data ("CE data" in the figure). Specifically, the cost event data may be stored in a respective storage medium or database 46-a, 46-b, 46-c (jointly referred to as "46") associated with the BSPs 15A-15N, biller consolidator 152 and/or CSPs 17A-17N. (For ease of illustration, only one BSP 15N and one CSP 17N is illustrated in FIG. 4). Commercially available databases may be used to implement database 46. Examples of commercially available databases include SAP® DB, IBM® Universal DB2 and iSeries, Informix® Dynamic Server, Microsoft® SQL Server and Oracle® 9iDatabase.

Cost event data may be created by billers A-N when specific services or goods are requested by or rendered to a customer. Billers A-N may then forward the cost data, either electronically or in printed form, to a BSP or biller consolidator 152 (e.g., when no BSP is present). The BSP or biller consolidator 152 may then format (if necessary) and store the cost event data in an associated database 46. Additionally or alternatively, where the chargeable services or goods are requested from or rendered by the BSP, biller consolidator, or CSP, the cost event data may be stored directly in database 46 by the BSP, biller consolidator, or CSP.

Consistent with embodiments of the invention, the cost event data may be stored electronically in a storage medium or database, such as database 46 in FIG. 4. As will be appreciated by those skilled in the art, various storage structures and arrangements may be provided for storing the cost event data. For instance, the cost event data may be structured into files or tables. Database tables are commonly known to those skilled in the art and are utilized as a storage structure in, for example, relational database environments. Further, data definition language (DDL) statements can be used for creating and modifying database tables or indexes. To access data in database 46, a conventional programming language, such as structured query language (SQL), can be employed. Other protocols may be used, such as file transfer protocol (ftp), to transfer files or data from a source. Moreover, database 46 may be implemented in various ways, such as a central or distributed database architecture. As will be appreciated by those skilled in the art, other storage structures, techniques and arrangements may be utilized and, therefore, embodiments of the invention are not limited to the examples mentioned above.

Consistent with embodiments of the invention, the cost event data may comprise specific information related to the services or goods to be invoiced. This information may include, for example, the name, type, sub-type and/or quantity of the services or goods that were provided or requested. Thus, for example, a service of the type "Printing" may have various sub-types, such as "Color" or "Black and White." In addition, the cost event data may indicate the date on which the services or goods were rendered or requested, as well as identify the various participants, such as the name of the provider of the services or goods, the customer, the provider's bank, the customer's bank, etc.

For purposes of illustration, FIG. 5 illustrates an exemplary file structure 28 for storing cost event data. File structure 28 may be organized as a flat file, table, etc. in database 46. Further, file structure 28 may contain data for a single cost event or data related to a plurality of cost events. For each cost event, file structure 28 may contain a number of data fields or items. For instance, as shown in FIG. 5, file structure 28 may include Type 28-A and/or Sub-Type 28-B fields. These items may contain data for defining the service or good by type and/or sub-type (e.g., Type=Delivery, Sub-Type=Local or International; or Type=Print Invoice, Sub-Type=Original or Reprint). In addition, a plurality of Participants 28-CA through 28-CN fields may be provided to define respective participants A-N by name and/or role (e.g., Participant=OverNightExpress, Inc., Role=Goods Courier; or Participant=Chase Manhattan; Role=Bank of Biller).

Various modifications, substitutions and/or additions may be made to the fields of the exemplary file structure 28. For example, additional data fields may be provided for each cost event, such as an invoice or record number for each cost event. Further, while certain examples have been provided, the fields illustrated in FIG. 5 may be populated with any type of data, including alphanumeric data. For instance, in one embodiment, alphanumeric or numeric codes are stored in the fields of file structure 28 and a look-up table is used to interpret the codes and determine the relevant cost event information.

In addition to storing cost event data, payer or business model definitions may be stored. For example, payer definition data may be stored separately or along with the cost event data in database 46 or another storage medium. This additional data may be used to evaluate the cost event data and determine the payer for an invoice based on one more factors. The factors may include the type and/or sub-type of services or goods, the participants involved, the roles of the participants, etc. In addition, the payer definition data may provide model definitions by which the payer is to be determined based on a set of predetermined factors. Consistent with embodiments of the invention, this data may be considered alone or together with other additional data when processing the cost event data.

For purposes of illustration, FIG. 6 illustrates an exemplary file structure 36 for storing the payer definition data. File structure 36 may be organized using conventional storage techniques (e.g., flat file, table, etc.) in database 46 or another storage medium. Further, file structure 36 may be adapted to provide payer definitions for a plurality of cost events, which are applicable for any number of participants or segments in a billing environment. Thus, for example, payer definitions may be set for an entire billing environment, or for particular segments or participants within a billing environment.

In the embodiment of FIG. 6, file structure 36 is illustrated with a plurality of fields, including Type 36-A and Sub-Type 36-B fields, as well as a corresponding Payer 36-C field which defines the payer (e.g., by Role) relative to the type and/or sub-type of service or good. For purposes of illustration, assume that file structure 36 is arranged as a table, and includes a corresponding payer definition for each type and/or sub-type of service or good. By using the Type 36-A and/or Sub-Type 36-B fields as an index, the appropriate payer for a cost event can be determined from the corresponding Payer 36-C field.

As will be appreciated by those of skill in the art, modifications, substitutions and/or additions may be made to the file structure 36 in order to take into account other factors for defining the payer for a cost event. For example, additional data fields may be provided to define one or more payers according to geographical data or customer account data. Further, the fields for file structure 36 may be populated with any type of data, including alphanumeric data. For instance, as with data structure 28, alphanumeric or numeric codes may be stored in the fields of structure 36 and a look-up table may be used to interpret the codes and determine the relevant payer information.

Consistent with embodiments of the present invention, additional data may be stored in database 46 or another storage medium. This additional data may be stored separately or together with the cost event and/or payer definition data, and used to determine the appropriate payer for a cost event. In one embodiment, the additional data comprises contract relationship data, which indicates the contract relationships between the participants. The contract relationship data may be stored individually for each contractual relationship, or the contract relationship data may be organized to store data for any number of contractual relationships in a billing environment. In the later case, contract relationship data may be grouped and stored according to various criteria, including all contractual relationships related to each customer or participant, groups of related participants, geographical regions, etc.

Figure 7:
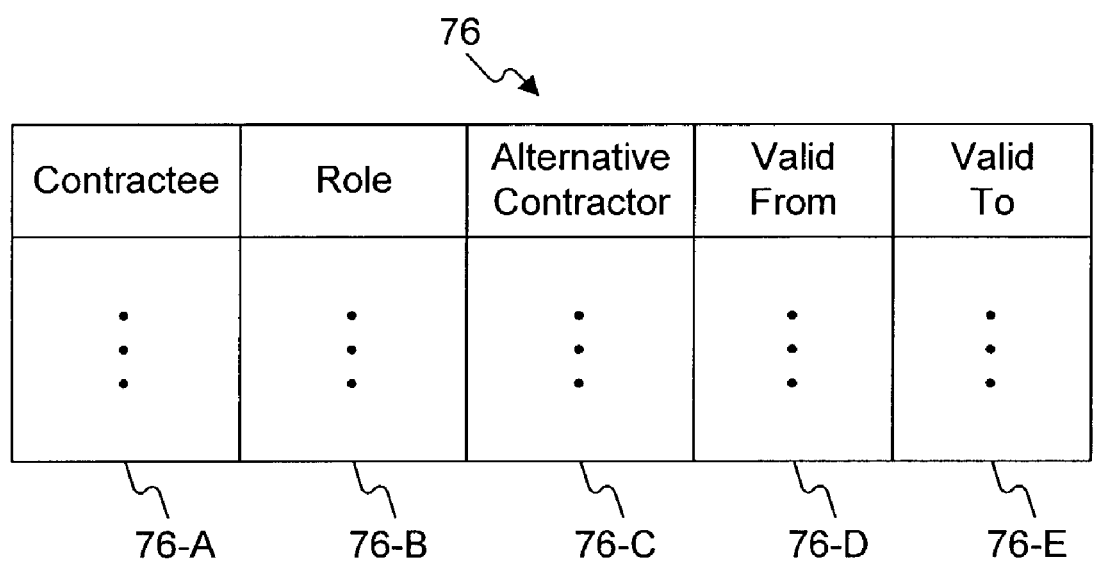
FIG. 7 is a block diagram of an exemplary file structure for storing contract relationship data, consistent with embodiments of the present invention.

By way of example, FIG. 7 illustrates an exemplary file structure 76 for storing contract relationship data. File structure 76 may be organized using conventional storage techniques (e.g., flat file, table, etc.) in database 46 or another storage medium. Further, file structure 76 may be adapted to provide contract relationship data for any range of participants or segments in a billing environment. Thus, for example, contract relationship data may be for all participants or a selected group of participants in a billing environment. As shown in FIG. 7, the exemplary file structure 76 includes a plurality of fields, including Contractee 76-A and Role 76-B fields, which define the name of the contractee and the role of the contractee for a particular contractual relationship. The role of the contractee may differ depending on the contractor involved in the relationship. Thus, a contractor field or identification code (not shown) may be included as part of the contract relationship data. Other fields may also be provided, such as an Alternative Contractor 76-C field which defines an alternative contractor (if any) and Valid From 76-D and Valid To 76-E fields which define the start and end dates of the contract.

As will be appreciated by those skilled in the art, FIG. 7 is merely an example and any data required to evaluate the contract may be included in file structure 76, such as the name of the contractor, the contract type, the contract status, the contract number or ID, etc. Further, the fields for file structure 76 may be populated with any type of data, including alphanumeric data. For example, alphanumeric or numeric codes may be stored in the fields of structure 76. Thus, where needed, codes may be used to identify contracts by number and/or to associate the same with particular contractors or participants. In such cases, a look-up table may be used to interpret the codes and analyze the contract relationship data.

The various data disclosed herein may be entered, updated and modified, according to the needs of the billing environment. For example, cost event data may be entered manually and/or created automatically in connection with the services or goods requested or provided. Cost event data may also be updated or modified and, where appropriate, the cancellation of cost events may be permitted. Further, other data such as the payer definition data and the contract relationship data may be entered manually or created automatically, and updates, modifications and cancellations of such data may also be permitted according to the needs of the billing environment.

Figure 8:
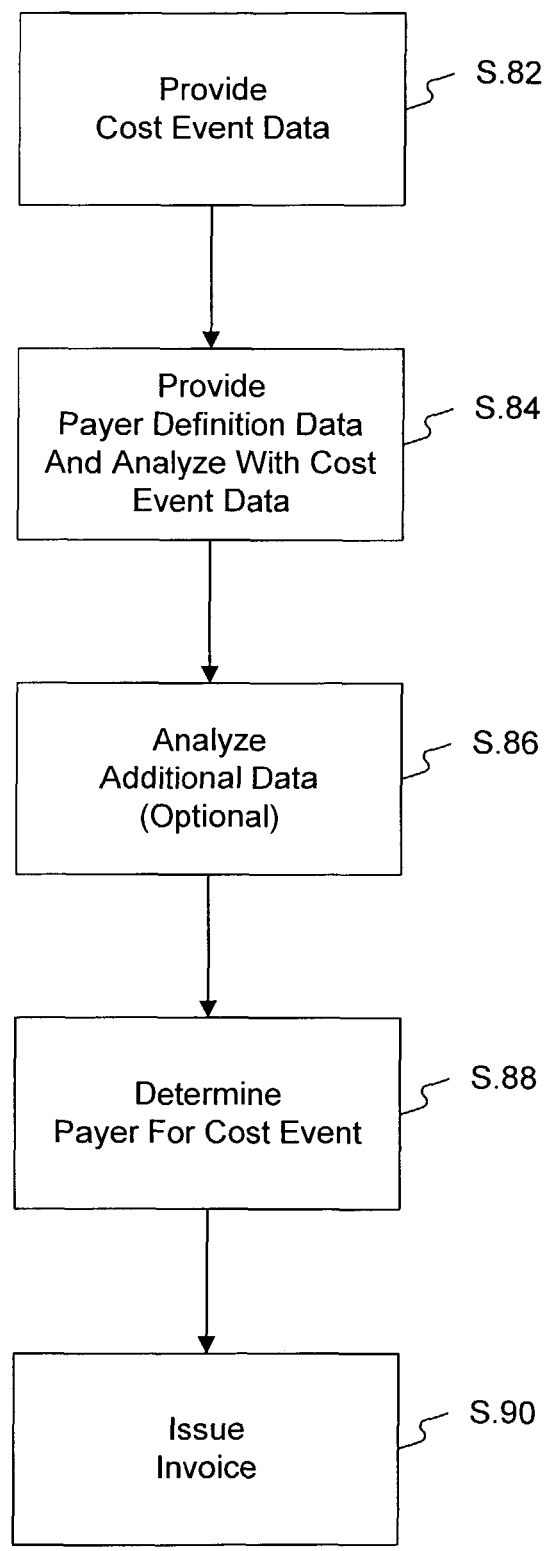
FIG. 8 is a flow chart of another exemplary method for determining payers in a billing environment, consistent with embodiments of the present invention.

Referring now to FIG. 8, a flowchart is provided of an another exemplary method for determining payers in a billing environment, consistent with embodiments of the invention. The exemplary method of FIG. 8 may be implemented with computer hardware and/or software, and/or provided as part of the functionality of an electronic billing system, such as the system of FIG. 3. By way of example, the exemplary method of FIG. 8 may be performed by billing consolidator 152 and/or any of the other components in the system (such as the BSPs or CSPs). Alternatively, the exemplary method of FIG. 8 may be implemented as a service billing feature that is incorporated into a separate application or system, such as a Customer Relations Management (CRM) system, that is linked to the billing environment and adapted to access relevant data (e.g., cost event data, payer definition data, etc.). Moreover, where feasible, the exemplary method of FIG. 8 may be performed manually by one or more individuals.

Although not specifically illustrated, the process flow of FIG. 8 may be performed with respect to each cost event or invoice to be processed. Such processing of cost events may be carried out individually in succession, or substantially simultaneously or in parallel, consistent with the needs of the billing environment. To facilitate the processing of volumes of cost events, the exemplary method of FIG. 8 may be performed on a predetermined cycle (daily, weekly, monthly, etc.)

As shown in FIG. 8, cost event data is provided (S.82). The cost event data may be retrieved from a storage medium (such as database 46), or received or gathered from a biller or entity that generated the cost event. The cost event data may include information related to a cost event based on a set of chargeable services or goods, etc. This information may include, for example, the type and/or sub-type of services or goods. In addition, the cost event data may indicate other information, such as the names and/or roles of the participants (e.g., the name of the provider of the services or goods, the customer, the provider's bank, the customer's bank, etc.).

As further illustrated in FIG. 8, payer definition data may be provided and analyzed with the cost event data (S.84). Consistent with embodiments of the invention, the payer definition data may be retrieved from a storage medium (such as database 46) or received from a biller or otherwise provided. The payer definition data may include information which defines the payer of a cost event based on one or more factors. These factors include, for example, the type and/or sub-type of services or goods, the participants involved and their corresponding roles. The payer definition data may serve as a model for determining the payers of cost events for the entire billing environment or for activity related to certain segments or groups of participants thereof. The payer definition data may also be provided as part of the cost event data, and retrieved with the cost event data. Alternatively, the payer definition data may be recorded and retrieved separately.

Optionally, other additional data may be provided (S.86) to analyze the same with the cost event and/or payer definition data and identify the payer for the cost event (S.88). For example, additional data such as contract relationship data, customer account data, etc. may be used to determine the appropriate payer. In one embodiment, contract relationship data is analyzed to confirm that a valid contract exits with the payer identified based on the cost event data and/or payer definition data. In such cases, all contracts that involve the identified payer may be located and analyzed. Additionally or alternatively, the contract relationship data related to the identified payer may be analyzed to determine if an alternative contractor or participant should be identified as the payer for the cost event.

Once the payer is identified, an invoice is generated and issued to the identified payer in order to request payment (S.90). Consistent with embodiments of the invention, the invoice may be generated based on the cost event data and/or other data and issued to the payer by various means, such as e-mail, a web site on the Internet, a printed invoice or bill mailed to the payer, etc. Conventional payment processing may also be provided as part of the exemplary method of FIG. 8 in order to accept and process payment from the payer.

In accordance with additional embodiments of the invention, the cost event data, payer definition data and/or additional data (e.g., contract relationship data, customer account data, etc.) may be considered individually or together to determine the payer of an invoice. Additionally or alternatively, particular data may be given priority over other data. Thus, for example, payer definition data may be given a lower priority to other data such as contract relationship data or customer account data, or vice versa. In this way, the payer can be designated, modified or updated according to the needs of the billing environment. Therefore, if an alternative contractor or special credits, awards or account status levels need to be applied, the contract relationship data and/or customer account data may be analyzed to identify the appropriate payer. In certain cases, the payer may be an entity other than that designated by the cost event and payer definition data. Such features permit the payer to be defined and identified more flexibly in billing environments, such as in the exemplary billing environment of FIG. 1.

Figure 9A:
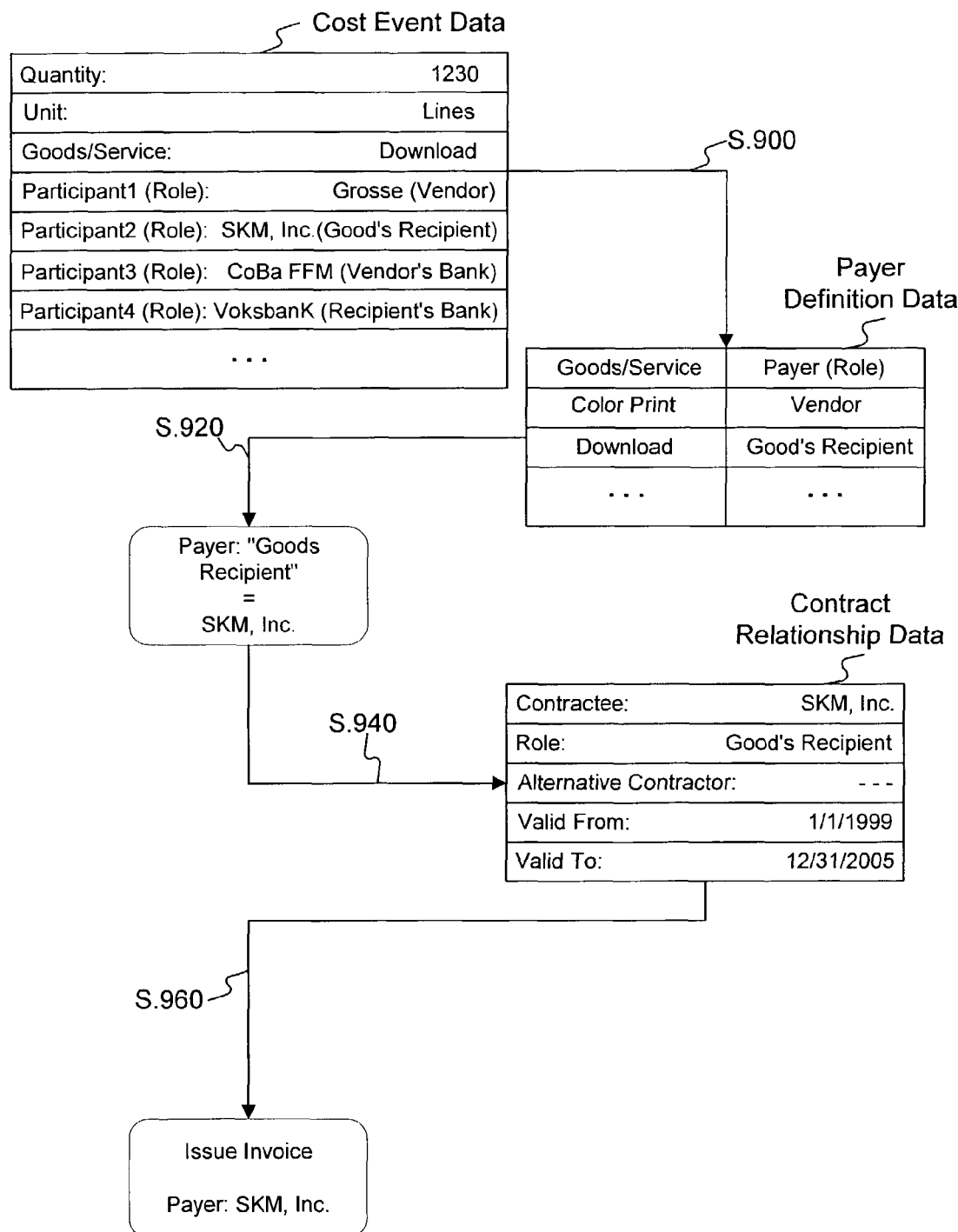
FIGS. 9A and 9B illustrate additional exemplary embodiments of the present invention.
Figure 9B:
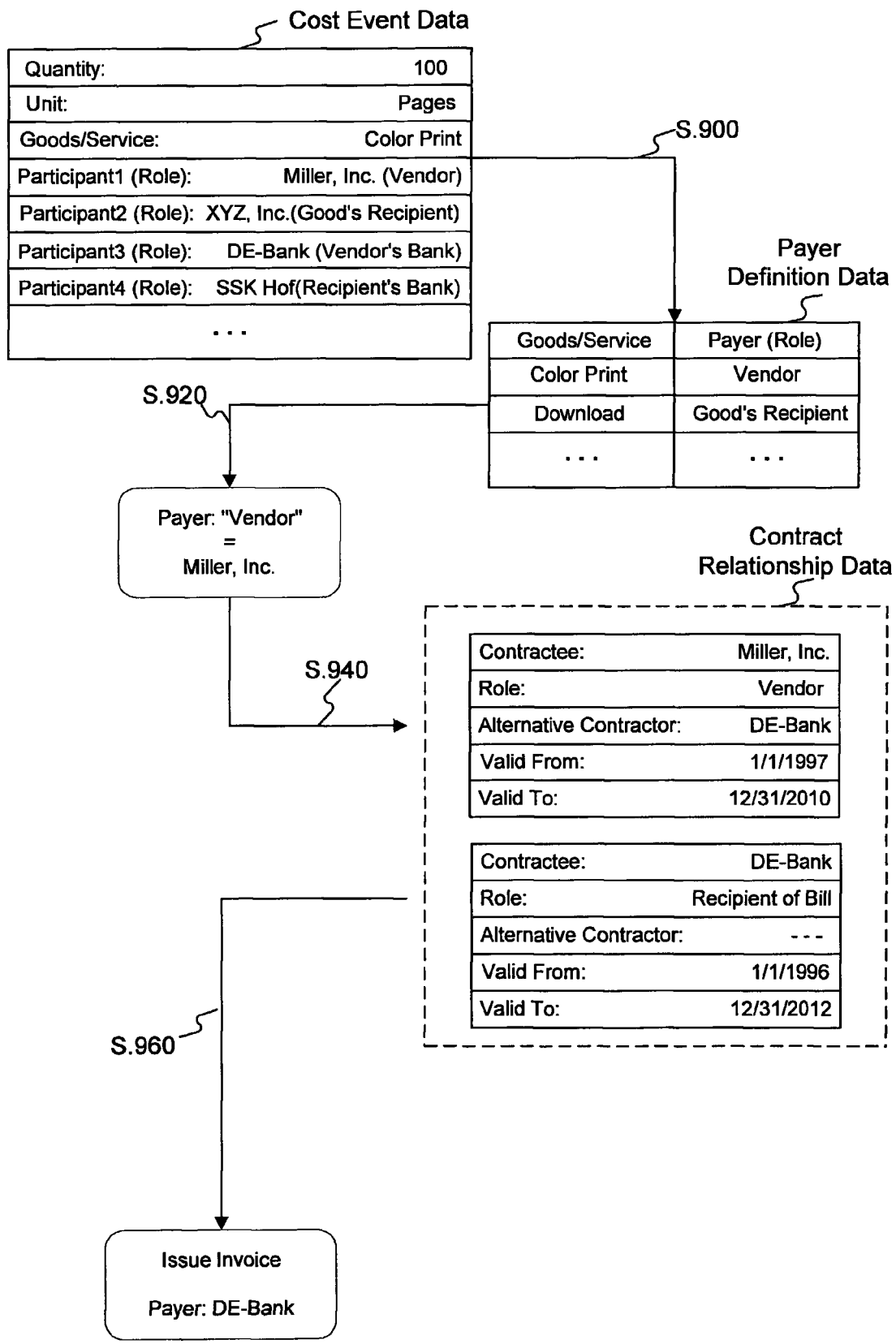

To provide further examples of the invention, reference is now made to the exemplary embodiments of FIGS. 9A and 9B. The examples of FIGS. 9A and 9B demonstrate methods for determining payers of cost events based on various factors, including the type and/or sub-type of goods or services, the participants involved and the contractual relationships between participants. As illustrated in FIGS. 9A and 9B, the exemplary method is performed by analyzing cost event data along with payer definition data and contract relationship data. Embodiments of the invention, however, are not limited to such factors and corresponding data, and substitutions or modifications can be made by those skilled in the art in view of the teachings herein.

As illustrated in the example of FIG. 9A, cost event data is provided for a particular good or service. In this case, the cost event data identifies a "Download" of 1230 lines of information. By way of example, this cost event could be recorded for a download of information from any source, such as an Internet web site or a database accessible by a computer modem or mobile phone connection. The "Download" could also relate to any service, such as a download service for customers or members of the public, a download service for information in connection with preparing an invoice or bill, etc.

The cost event data in the example of FIG. 9A provides other information, such as the participants involved in or related to the cost event and their corresponding roles. In particular, the cost event data indicates: Grosse as the Vendor; SKM, Inc. as the Good's Recipient; CoBa FFM as the Vendor's Bank; and Voksbank as the Recipient's Bank. Thus, in this example, Grosse may be viewed as the "bille" and SKM, Inc. as the "customer" and the respective banks for these entities are CoBa FFM and Voksbank.

As further illustrated in the example of FIG. 9A, the cost event data may be analyzed and compared with payer definition data (S.900). Consistent with embodiments of the invention, the payer definition data may represent a payer "model" and include data which defines payers for cost events according to the type and/or sub-type of rendered or requested goods or services. In one embodiment, payers may be defined according to their roles. Thus, as illustrated in the example of FIG. 9A, if the goods or service relates to a "Color Print," then the payer is the participant who has the role of a "Vendor" in the cost event. Additionally, if the goods or service relates to a "Download," then the payer is the participant who has the role of a "Good's Recipient" in the cost event. As will be appreciated by those skilled in the art, other payer definitions may be provided.

By comparing the cost event data with the payer definition data, it is determined (S.920) that the payer for the "Download" is the participant who has the role of "Good's Recipient." In the example of FIG. 9A, the good's recipient is SKM, Inc., and thus the payer for this cost event.

Consistent with embodiments of the invention, additional data may be analyzed to identify and/or verify the payer. For instance, as illustrated in FIG. 9A, relevant contract relationship data may be examined (S.940). An analysis of the cost relationship data may be made to confirm that a valid contract exists with SKM, Inc. and/or to identify alternative contractors. In this case, as shown in FIG. 9A, a valid contract exists with SKM, Inc. in the role of a "Good's Recipient" and there is no alternative contractor. Therefore, a verification is made that SKM, Inc. is the good's recipient and payer for the cost event and, as a result an invoice is issued to SKM, Inc. (S.960) in order to request payment.

Referring now to FIG. 9B, another exemplary embodiment of the invention is provided. As illustrated in the example of FIG. 9B, cost event data is provided for a particular good or service. In this case, the cost event data identifies a "Color Print" of 100 pages. By way of example, this cost event could be related to a request or order for a color print of various types of pages, such as an advertisement for distribution to the public or an insert for invoice statements. The "Color Print" could also be provided for various types of participants, including customers or members of the public, as well as vendors or merchants who need to the color pages to render services or goods to their customers.

The cost event data in the example of FIG. 9B provides other information, such as the participants involved in or related to the cost event and their corresponding roles. In particular, the cost event data indicates: Miller, Inc. as the Vendor; XYZ, Inc. as the Good's Recipient; DE-Bank as the Vendor's Bank; and SSK Hof as the Recipient's Bank.

As further illustrated in the example of FIG. 9B, the cost event data may be analyzed and compared with payer definition data (S.900). In this embodiment, payers of cost events are defined according to their roles. Therefore, if the goods or service relates to a "Color Print," then the payer is the participant who has the role of a "Vendor" in the cost event. Additionally, as shown in FIG. 9B, if the goods or service relates to a "Download," then the payer is the participant who has the role of a "Good's Recipient" in the cost event. Other payer definitions may be provided, consistent with embodiments of the invention.

As a result of the analysis and comparison of the cost event data and the payer definition data, it is determined (S.920) that the payer for the "Color Print" is the participant who has the role of "Vendor." In the example of FIG. 9B, the vendor is Miller, Inc., and thus the payer for this cost event.

As stated above, additional data may be analyzed to identify and/or verify the payer. For instance, as shown in FIG. 9B, relevant contract relationship data may be examined (S.940). An analysis of the cost relationship data may be made to confirm that a valid contract exists with Miller, Inc. and/or identify alternative contractors. In the example of FIG. 9B, a valid contract exists with Miller, Inc. in the role of a "Vendor." However, an alternative contractor is identified, DE-Bank. In particular, a separate contractual relationship exists between Miller, Inc. and DE-Bank, wherein DE-Bank is responsible for receiving and handling bills to Miller, Inc. Therefore, a final determination of the payer designation is made, such that DE-Bank is the payer for the cost event and, accordingly, an invoice is issued to DE-Bank (S.960) in order to request payment. As the bill recipient for Miller, Inc., DE-Bank may pay the invoice and, thereafter, request settlement or payment from Miller, Inc. concerning the invoice, as well as others that might have been paid by DE-Bank on behalf of Miller, Inc.

As disclosed herein, embodiments of the invention may be implemented to enable the invoicing of participants for the services or goods provided by biller(s) on their behalf. For example, a service provider may perform a set of chargeable services on behalf of its customers. In certain cases, several participants may be involved in the services to be invoiced. The determination of which participants pay for these services can advantageously be made, consistent with embodiments of the invention, based on the type of service and/or participants involved.

To provide an example, assume that a service provider performs the services of "bill printing" and "bill mailing." Using the payer definition data and/or other data, the "bill printing" and "bill mailing" for domestic services may be defined as being payable by the original biller. In contrast, the "bill printing" and "bill mailing" for international service may be payable by the recipient of the bill.

As further disclosed herein, various relationships may exist between participants of a cost event, such as direct and indirect contractual relationships. In certain cases, a direct contract may exist between, for example, a main biller and a participant. In other cases, only an indirect contract may exist between the main biller and a participant. An indirect contract may imply that the participant has a contract with another participant and that the latter has a direct contract with the main biller. Consistent with embodiments of the present invention, such contractual relationships may be taken into account when determining the payers of cost events.

In one embodiment, contract relationship data may be analyzed to identify the existence of a contractual relationship between the biller and payer. The identification of a valid, contractual relationship may be set as a requirement before an invoice can be sent to the payer. If a direct contract is identified to exist between the biller and payer, then an invoice is sent to the payer (see, e.g., the example of FIG. 9A). If however, a direct contract does not exist and/or an indirect contract is identified, then an alternative participant may be designated as the payer and an appropriate invoice is sent to the payer (see, e.g., the example of FIG. 9B). In the latter case, the alternative participant may have direct contractual relationships with the original biller and/or the participant who has an indirect contractual relationship with the original biller.

To provide yet another example, assume that a service provider A performs the service of "bill mailing" which is payable by the biller who submitted the bill. Participants B and C (also service providers) may perform the services of "billing" and "bill printing." All billers submitting bills to service providers B or C may not have a direct contract with service provider A. Therefore, service provider A may wish to send the bill for its services to service providers B and C. Consistent with embodiments, such contract relationship data may be analyzed alone or in combination with other data (cost event data, payer definition data, etc.) so that the payers are defined appropriately. In turn, service providers B and C can either forward these bills to the original biller or take these costs into account in their "billing" fees.

In accordance with embodiments of the invention, payer definition or business model data may be defined. Such data may identify the payers for cost events according to the role of participants in the services or goods provided. Roles for participants may be defined by any entity, including the original biller. Updates or modifications to the payer definition or business model data may be permitted to keep the data current. The use of such data permits the payers of cost events to be flexibly defined and determined.

The disclosed embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implemented the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infra-red (IR) link, a radio link, such as a Universal Mobile Telecommunications System (UMTS), Global System for Mobile Communication (GSM), Code Division Multiple Access (CDMA), or a satellite link.

Transmission protocols and data formats are also known, for example, as transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), wireless application markup language (WML), Standard Generalized Markup Language (SGML), etc. Such features may be utilized to implement embodiments of the present invention, as disclosed herein.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including the reordering of steps and the insertion or deletion of steps, without departing from the principles of the invention.

It is intended, therefore, that the specification and examples be considered as exemplary only, with a true scope and spirit of the invention being indicated by the following claims and their full scope of equivalents.

What is claimed is:

1. A computer implemented method for determining payers of cost events in a billing environment, the method comprising:

storing, in a memory device, prior to the occurrence of a plurality of different types of cost events, payer definition data that defines payers related to the plurality of different types of cost events, wherein the payer definition data comprises identifiers representing different types of services or goods and a name of a payer for each specific type of service or good, wherein the name of the payer for each specific type of service or good is independently determined based on a role of a participant;

providing cost event data that relates to a cost event, each unit of the cost event data comprising at least a name of a first participant, a name of a second participant, and an identifier representing a service or good relating to the cost event, wherein each participant is associated with a role included in the cost event data;

providing additional data, wherein the additional data comprises at least one of geographical data, customer account data, and contract relationship data;

analyzing, using a processor, the cost event data, the payer definition data, and the additional data according to a predetermined priority to identify, based on the role and the identifier included in the cost event data, the identifiers and the name of the payer for each specific type of service or good included in the payer definition data, and the additional data, a payer of the cost event to thereby determine which of the first and second participants is a payer of the cost event; and creating an invoice for the cost event to request payment from the identified payer.

2. A computer implemented method for determining payers according to claim 1, wherein the payer definition data serves as a model to define payers for a plurality of cost events and is stored and provided separately from the cost event data.

3. A computer implemented method for determining payers according to claim 1, wherein the geographical data is analyzed to determine the payer of the at least one cost event based on the location of one of the participants or where a service or good related to the cost event is rendered.

4. A computer implemented method for determining payers according to claim 1, wherein the customer account data is analyzed to determine whether a participant, other than that designated by the payer definition data, should be identified as the payer for cost event.

5. A computer implemented method for determining payers according to claim 4, wherein the customer account data includes data identifying a payer according to at least one of an award, credit and account status level.

6. A computer implemented method for determining payers according to claim 1, wherein the contract relationship data comprises data indicating contractual relationships between the participants involved with the at least one cost event.

7. A computer implemented method for determining payers according to claim 6, further comprising analyzing the contract relationship data to confirm that a contractual relationship exists with a participant identified as the payer.

8. A computer implemented method for determining payers according to claim 7, wherein the contractual relationship comprises at least one of a direct contract, an indirect contract and a multi-level indirect contract.

9. A computer implemented method for determining payers of cost events, the method comprising:

storing, in a memory device, prior to the occurrence of a plurality of different types of cost events, payer definition data that defines payers related to the plurality of different types of cost events, wherein the payer definition data comprises identifiers representing different types of services or goods and a name of a payer for each specific type of service or good, wherein the name of the payer for each specific type of service or good is independently determined based on a role of a participant;

providing cost event data that relates to a cost event, each unit of the cost event data comprising at least a name of a first participant, a name of a second participant, and an identifier representing a service or good relating to the cost event, wherein each participant is associated with a role included in the cost event data;

providing contract relationship data, the contract relationship data indicating contractual relationships between the first and second participants related to the cost event;

analyzing, using a processor, the cost event data, the payer definition data and the contract relationship data to identify, based on the role and the identifier included in the cost event data and the identifiers and the name of the payer for each specific type of service or good included in the payer definition data, the payer of the cost event, wherein analyzing comprises analyzing the contract relationship data to identify a contractual relationship with a participant defined as a payer for the cost event by the payer definition data to thereby determine which of the first and second participants is a payer of the cost event; and identifying, using the processor, an alternative participant as the payer when a direct contractual relationship is determined not to exist with the identified participant and an indirect contractual relationship is indicated by the contract relationship data.

10. A computer implemented method for determining payers according to claim 9, wherein analyzing the contract relationship data comprises confirming that a contractual relationship exists between a biller of the at least one cost event and the participant defined as the payer by the payer definition data.

11. A computer implemented method for determining payers according to claim 10, wherein the contractual relationship comprises at least one of a direct contract, an indirect contract and a multi-level indirect contract.

12. A computer implemented method for determining payers according to claim 11, further comprising identifying the participant as the payer according to the payer definition data when it is confirmed that a direct contract exists between the biller and the participant.

13. A computer implemented method for determining payers according to claim 9, wherein the indirect contractual relationship indicated by the contract relationship data is a multi-level indirect contractual relationship.

14. A computer implemented method for determining payers according to claim 9, further comprising creating an invoice for the at least one cost event to request payment from the identified payer.

15. A computer implemented method for determining payers according to claim 9, wherein the payer definition data serves as a model to define payers for a plurality of cost events and is provided separately from the cost event data.

16. A computer implemented method for determining payers according to claim 9, wherein the method is performed by a biller consolidator.

17. A system for determining payers of cost events, each cost event relating to a billable service or good and involving a plurality of participants, the system comprising:
a processor;
a memory storing instructions that cause the processor to perform a method comprising:
storing, prior to the occurrence of a plurality of different types of cost events, payer definition data that defines payers related to the plurality of different types of cost events, wherein the payer definition data comprises identifiers representing different types of services or goods and a name of a payer for each specific type of service or good, wherein the name of the payer for each specific type of service or good is independently determined based on a role of a participant;
storing cost event data that relates to a cost event, each unit of the cost event data comprising at least a name of a first participant, a name of a second participant, and an identifier representing a service or good relating to the cost event, wherein each participant is associated with a role included in the cost event data;
storing additional data, wherein the additional data comprises at least one of geographical data, customer account data, and contract relationship data;
analyzing the cost event data, the payer definition data, and the additional data according to a predetermined priority to identify, based on the role and the identifier included in the cost event data, the identifiers and the name of the payer for each specific type of service or good included in the payer definition data, and the additional data, a payer of the cost event to thereby determine which of the first and second participants is a payer of the cost event; and
issuing an invoice for the cost event to request payment from the identified payer.

18. A system for determining payers according to claim 17, wherein the payer definition data serves as a model to define payers for a plurality of cost events and is provided separately from the cost event data.

19. A system for determining payers according to claim 17, wherein the geographical data is analyzed to determine the payer of the at least one cost event based on the location of one of the participants or where a service or good related to the cost event is rendered.

20. A system for determining payers according to claim 17, wherein the customer account data is analyzed to determine whether a participant, other than that designated by the payer definition data, should be identified as the payer for cost event.

21. A system for determining payers according to claim 20, wherein the customer account data includes data identifying a payer according to at least one of an award, credit and account status level.

22. A system for determining payers according to claim 17, wherein the contract relationship data comprises data indicating contractual relationships between the participants involved with the at least one cost event.

23. A system for determining payers according to claim 22, wherein the analyzing further comprises analyzing the contract relationship data to confirm that a contractual relationship exists with a participant identified as the payer.

24. A system for determining payers according to claim 23, wherein the contractual relationship comprises at least one of a direct contract, an indirect contract and a multi-level indirect contract.

25. A non-transitory computer-readable medium that stores program instructions that are executable by a computing-based environment to perform a method for determining payers of cost events, each cost event relating to a billable service or good and involving a plurality of participants, the method comprising:
storing, prior to the occurrence of a plurality of different types of cost events, payer definition data that defines payers related to the plurality of different types of cost events, wherein the payer definition data comprises identifiers representing different types of services or goods and a name of a payer for each specific type of service or good, wherein the name of the payer for each specific type of service or good is independently determined based on a role of a participant;

providing cost event data that relates to a cost event, each unit of the cost event data comprising at least a name of a first participant, a name of a second participant, and an identifier representing a service or good relating to the cost event, wherein each participant is associated with a role included in the cost event data;

providing additional data, wherein the additional data comprises at least one of geographical data, customer account data, and contract relationship data;

analyzing the cost event data, the payer definition data, and the additional data according to a predetermined priority to identify, based on the role and the identifier included in the cost event data, the identifiers and the name of the payer for each specific type of service or good included in the payer definition data, and the additional data, a payer of the cost event to thereby determine which of the first and second participants is a payer of the cost event; and creating an invoice for the cost event to request payment from the identified payer.

26. A computer-readable medium according to claim 25, wherein the additional data comprises contract relationship data.

27. A computer-readable medium according to claim 26, wherein the contract relationship data comprises data indicating contractual relationships between the participants involved with the at least one cost event.

28. A computer-readable medium according to claim 27, wherein the method further comprises analyzing the contract relationship data to confirm that a contractual relationship exists between a biller of the at least one cost event and a participant identified as the payer.

29. A computer-readable medium according to claim 28, wherein the contractual relationship comprises at least one of a direct contract, an indirect contract and a multi-level indirect contract.

30. A computer-readable medium that stores program instructions that are executable by a computing-based environment to perform a method for determining payers of cost events, the method comprising:

storing, prior to the occurrence of a plurality of different types of cost events, payer definition data that defines payers related to the plurality of different types of cost events, wherein the payer definition data comprises identifiers representing different types of services or goods and a name of a payer for each specific type of service or good, wherein the name of the payer for each specific type of service or good is independently determined based on a role of a participant;

providing cost event data that relates to a cost event, each unit of the cost event data comprising at least a name of a first participant, a name of a second participant, and an identifier representing a service or good relating to the cost event, wherein each participant is associated with a role included in the cost event data;

providing contract relationship data, the contract relationship data indicating contractual relationships between the participants related to the cost event; and analyzing the cost event data and the payer definition data to identify, based on the role and the identifier included in the cost event data and the identifiers and the name of the payer for each specific type of service or good included in the payer definition data, a payer of the cost event, wherein analyzing comprises analyzing the contract relationship data to identify a contractual relationship with a participant defined as a payer for the cost event by the payer definition data to thereby determine which of the first and second participants is a payer of the cost event; and identifying an alternative participant as the payer when a direct contractual relationship is determined not to exist with the identified participant and an indirect contractual relationship is indicated by the contract relationship data.

31. A computer-readable medium according to claim 30, wherein analyzing the contract relationship data comprises confirming that a contractual relationship exists between the biller and the participant defined as the payer by the payer definition data.

32. A computer-readable medium according to claim 31, wherein the contractual relationship comprises at least one of a direct contract, an indirect contract and a multi-level indirect contract.

33. A computer-readable medium according to claim 32, wherein the method further comprises identifying the participant as the payer according to the payer definition data when it is confirmed that a direct contract exists between the biller and the participant.

34. A computer-readable medium according to claim 32, wherein the indirect contractual relationship indicated by the contract relationship data is a multi-level indirect contractual relationship.

35. A computer-readable medium according to claim 30, wherein the method further comprises creating an invoice for the at least one cost event to request payment from the identified payer.

* * * * *